(12) United States Patent
Lim et al.

(10) Patent No.: US 11,099,435 B2
(45) Date of Patent: Aug. 24, 2021

(54) TRANSMITTANCE-VARIABLE DEVICE

(71) Applicant: LG Chem, Ltd., Seoul (KR)

(72) Inventors: Eun Jung Lim, Daejeon (KR); Sergey Belyaev, Daejeon (KR); Dong Hyun Oh, Daejeon (KR); Jung Sun You, Daejeon (KR); Jin Hong Kim, Daejeon (KR); Hyun Jun Lee, Daejeon (KR); Min Jun Gim, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 16/650,238

(22) PCT Filed: Oct. 30, 2018

(86) PCT No.: PCT/KR2018/012987
§ 371 (c)(1),
(2) Date: Mar. 24, 2020

(87) PCT Pub. No.: WO2019/088640
PCT Pub. Date: May 9, 2019

(65) Prior Publication Data
US 2020/0233246 A1 Jul. 23, 2020

(30) Foreign Application Priority Data

Oct. 31, 2017 (KR) .................. 10-2017-0143741

(51) Int. Cl.
*G02F 1/1337* (2006.01)
*G02F 1/1347* (2006.01)
(Continued)

(52) U.S. Cl.
CPC ........... *G02F 1/1337* (2013.01); *G02B 27/01* (2013.01); *G02C 7/101* (2013.01); *G02F 1/1347* (2013.01); *G02F 1/13475* (2013.01)

(58) Field of Classification Search
CPC ........... G02F 1/13725; G02F 1/133365; G02F 1/133528; G02F 1/1347; G02F 1/1334;
(Continued)

(56) References Cited

U.S. PATENT DOCUMENTS 9,130,097 B2 * 9/2015 Taheri ................. G02F 1/13762
9,791,607 B2 10/2017 Kim et al.
(Continued)

FOREIGN PATENT DOCUMENTS

JP 20035148 A 1/2003
JP 2006267825 A 10/2006
(Continued)

OTHER PUBLICATIONS

International Search Report from Application No. PCT/KR2018/012987 dated Feb. 1, 2019, 2 pages.
(Continued)

*Primary Examiner* — Thoi V Duong
(74) *Attorney, Agent, or Firm* — Lerner, David, Littenberg, Krumholz & Mentlik, LLP

(57) ABSTRACT

A transmittance-variable device is disclosed herein. In some embodiments, a transmittance-variable device includes first and second guest host layers, the first and second guest host layers are superposed, wherein each of the first and second guest host layers comprise a liquid crystal host and a dichroic dye guest, and wherein the device is capable of switching between a transparent mode and a black mode. The transmittance-variable device can exhibit high transmittance in the transparent state and a high shielding rate in the black state, and can exhibit a high contrast ratio even at the inclination angle, and exhibit excellent viewing angle symmetry in all directions. Such a transmittance-variable device can be applied to various applications including various architectural or automotive materials which need to
(Continued)

adjust the transmittance, or eyewear such as goggles for augmented reality experience or sports, sunglasses or helmets.

15 Claims, 5 Drawing Sheets

(51) Int. Cl.
*G02F 1/1335* (2006.01)
*G02B 27/01* (2006.01)
*G02C 7/10* (2006.01)

(58) Field of Classification Search
CPC .............. G02F 1/1335; G02F 1/1337; G02F 1/133509; G02F 1/133784; G02F 1/133788; G02F 1/13471; G02F 1/13737; G02F 1/1333; G02F 1/133362; G02F 1/13378; G02F 1/13475; G02F 1/139; G02B 27/01; G02B 27/0172; G02C 7/101; G02C 7/12
See application file for complete search history.

(56) References Cited

U.S. PATENT DOCUMENTS

| | | |
|---|---|---|
| 2006/0215096 A1 | 9/2006 | Iwamoto et al. |
| 2008/0094545 A1 | 4/2008 | Ko |
| 2014/0340727 A1 | 11/2014 | Mori et al. |
| 2015/0177435 A1 | 6/2015 | Kim et al. |
| 2017/0090237 A1 | 3/2017 | Kim et al. |
| 2017/0276960 A1* | 9/2017 | Osterman ........... G02F 1/13439 |
| 2017/0293058 A1 | 10/2017 | Lee et al. |
| 2019/0049641 A1 | 2/2019 | Oh et al. |

FOREIGN PATENT DOCUMENTS

| | | |
|---|---|---|
| JP | 2008233412 A | 10/2008 |
| KR | 20070046353 A | 5/2007 |
| KR | 20080035877 A | 4/2008 |
| KR | 20170003266 A | 1/2017 |
| KR | 20170004909 A | 1/2017 |
| KR | 20170054918 A | 5/2017 |
| KR | 20170117893 A | 10/2017 |
| TW | 201331249 A | 8/2013 |
| WO | 2015047013 A1 | 4/2015 |
| WO | 2017179940 A1 | 10/2017 |

OTHER PUBLICATIONS

Taiwanese Search Report for Application No. TW 107138454 dated Jun. 24, 2019, 1 page.

* cited by examiner

[Figure 1]
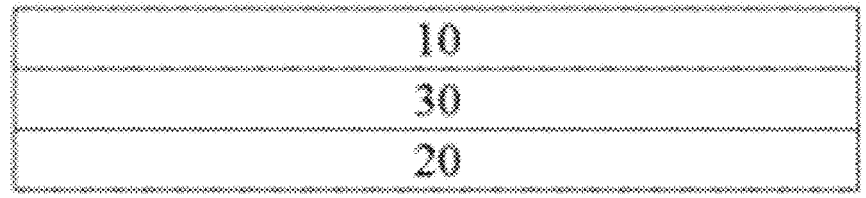
[Figure 2]
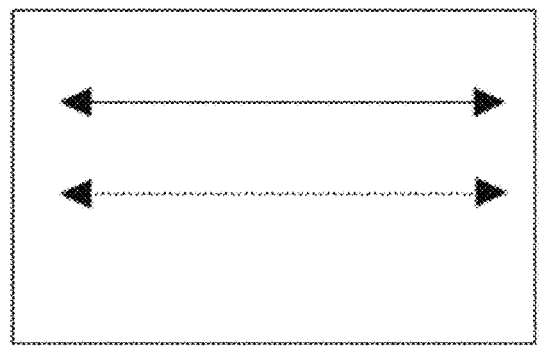
[Figure 3]
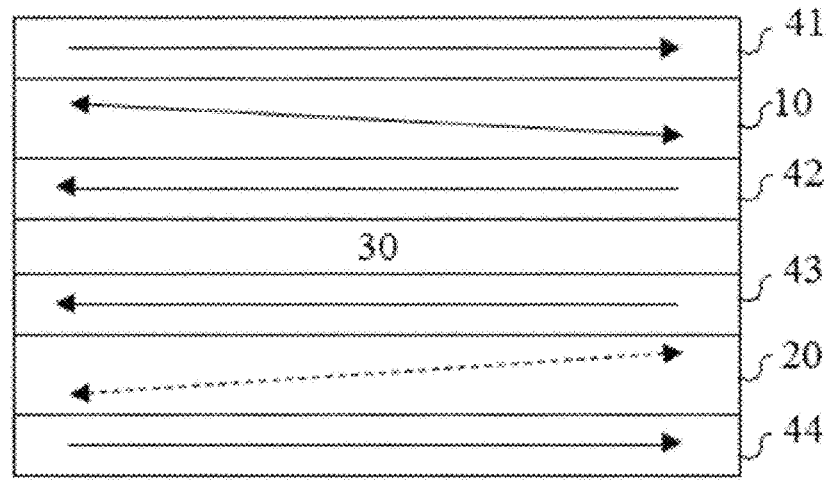
[Figure 4]

[Figure 5]

| 101 |
|---|
| 10 |
| 102 |
| 103 |
| 20 |
| 104 |

[Figure 6]

| 101 |
|---|
| 10 |
| 102 |
| 30 |
| 103 |
| 20 |
| 104 |

[Figure 7]

| 101 |
|---|
| 10 |
| 102 |
| 20 |
| 103 |

[Figure 8]
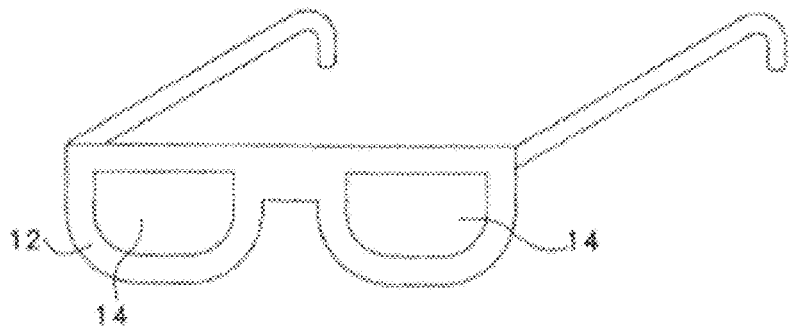
[Figure 9]
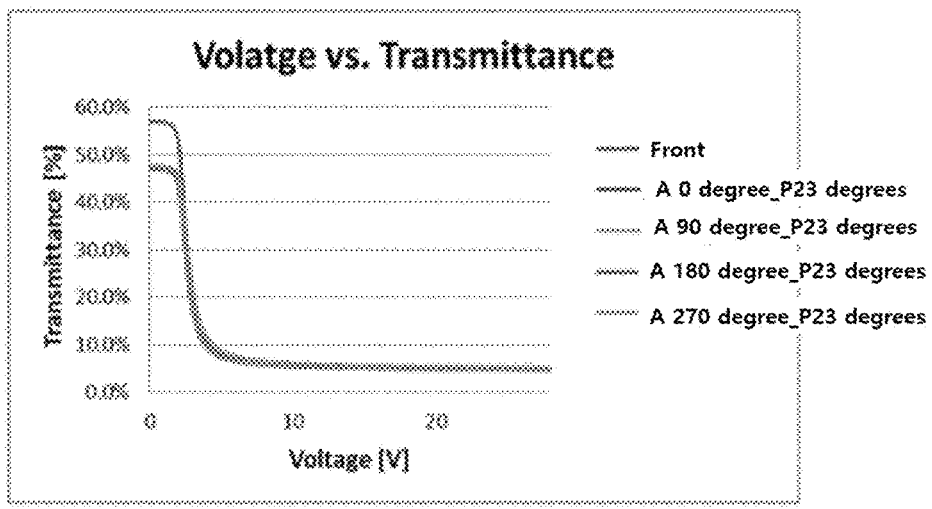
[Figure 10]
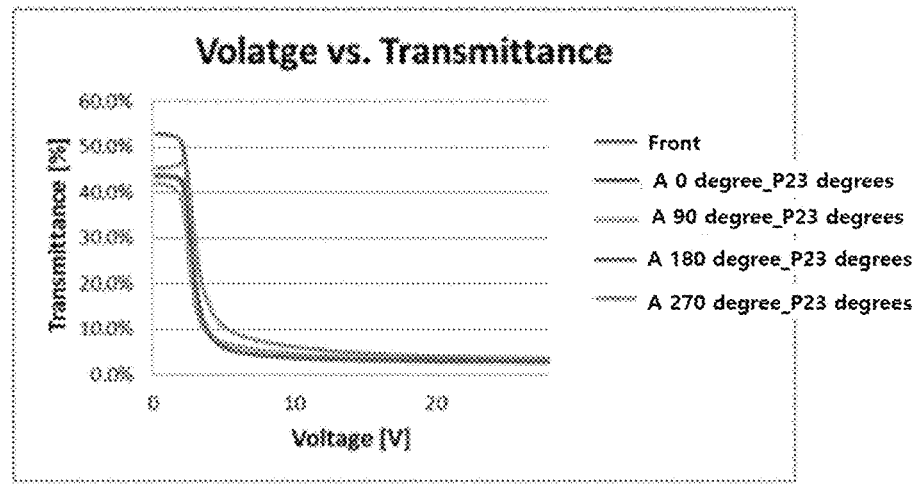

[Figure 11]
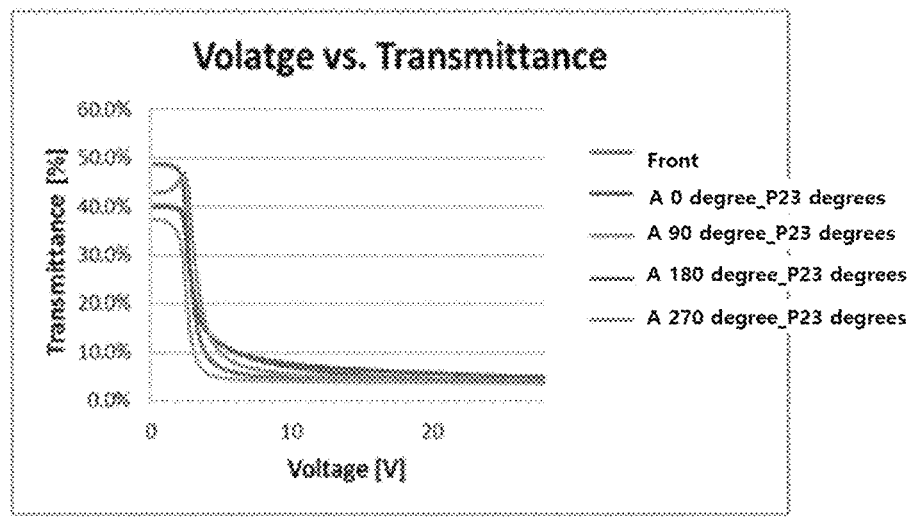
[Figure 12]
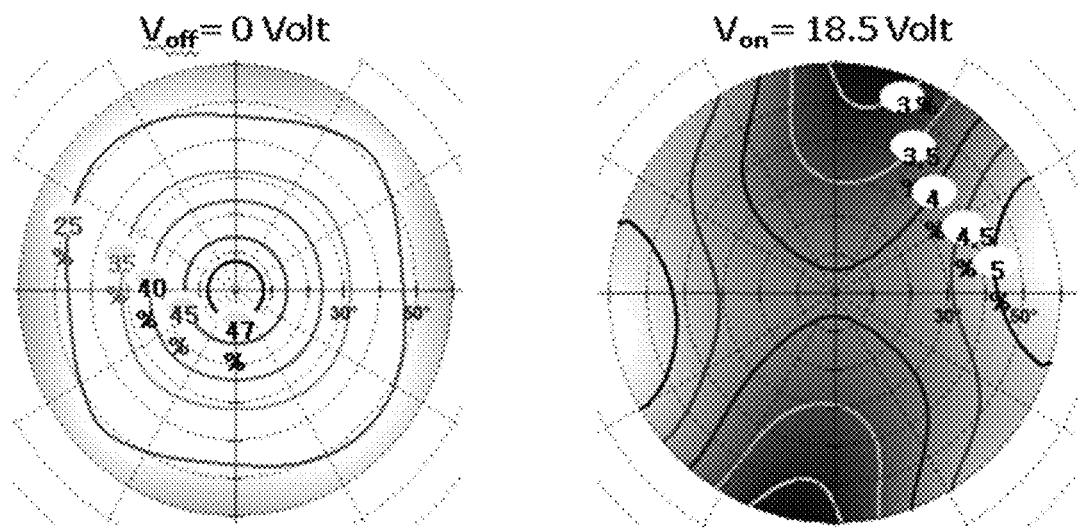

[Figure 13]
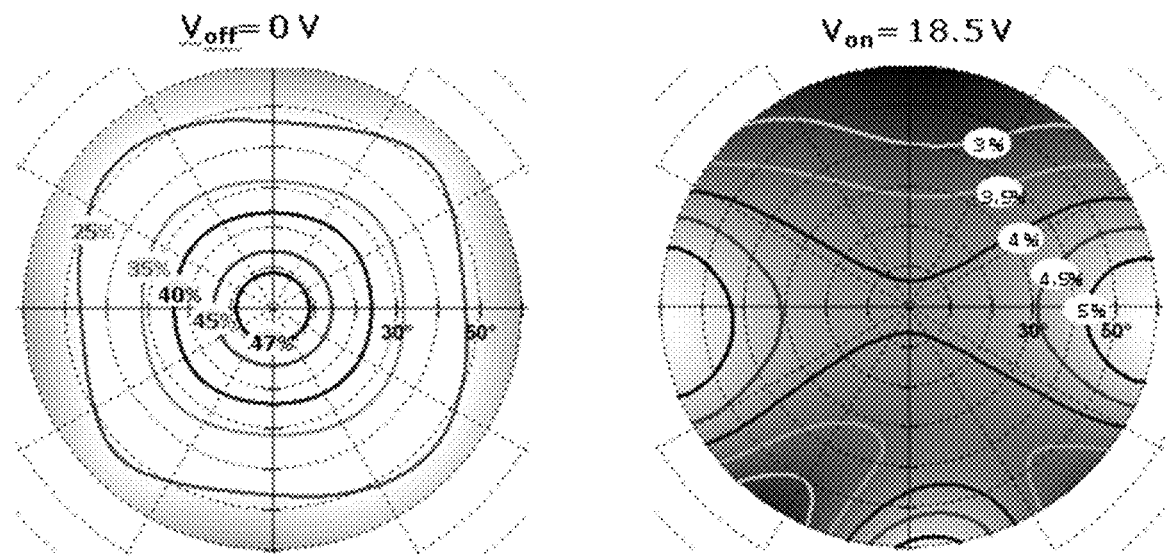
[Figure 14]
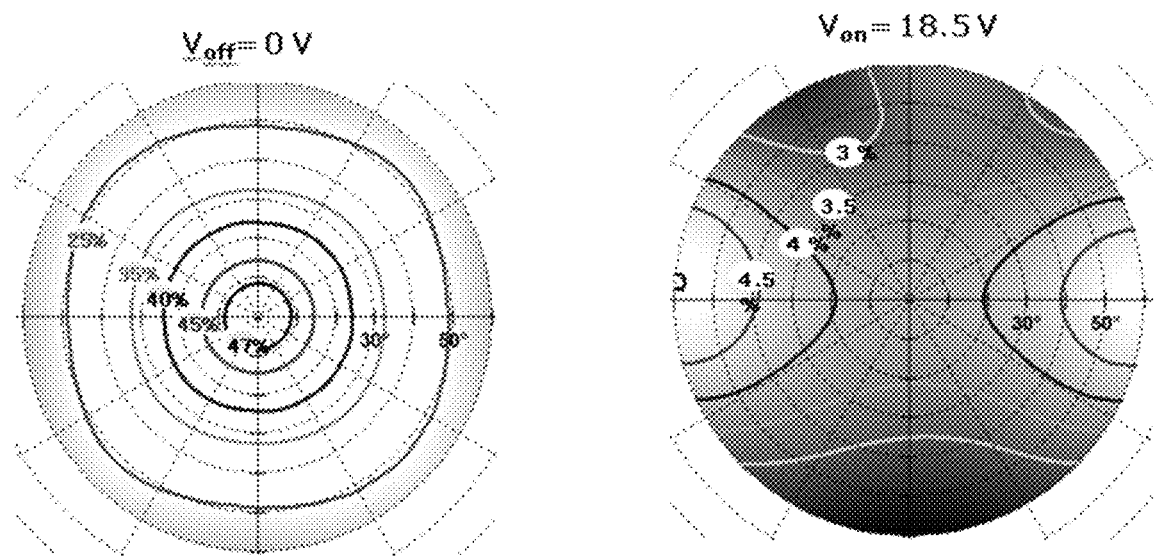

US 11,099,435 B2

TRANSMITTANCE-VARIABLE DEVICE

CROSS-REFERENCE TO RELATED APPLICATION(S)

The present application is a national phase entry under 35 U.S.C. § 371 of International Application No. PCT/KR2018/012987, filed on Oct. 30, 2018, which claims priority from Korean Patent Application No. 10-2017-0143741, filed on Oct. 31, 2017, the disclosures of which are incorporated by reference herein.

TECHNICAL FIELD

The present application relates to a transmittance-variable device.

BACKGROUND ART

A transmittance-variable device using a so-called GH cell (guest host cell), to which a mixture of a host material, which is mainly a liquid crystal compound, and a dichroic dye guest is applied, is known (for example, Patent Document 1).

Such a transmittance-variable device is applied to various applications including eyewear such as sunglasses, building outer walls, vehicle sunroofs and the like. Recently, application of the transmittance-variable element to eyewear for the so-called augmented reality (AR) experience has been studied as well.

Such a transmittance-variable device adjusts the transmittance by adjusting the orientation of the dichroic dye guest in the GH cell.

A problem that such a transmittance-variable device has is poor viewing angle characteristics. For example, if a black state is implemented by overlapping two GH cells and then crossing the optical axes of the respective GH cells, there is a problem that even when the viewing angle characteristics in the horizontal direction are symmetrical, the viewing angle characteristics in the vertical direction are shifted to one side.

PRIOR ART DOCUMENTS

<Patent Documents>
(Patent Document 1) European Unexamined Patent Publication No. 0022311

BRIEF DESCRIPTION OF DRAWINGS

FIGS. 1 to 7 are schematic diagrams of exemplary transmittance-variable devices of the present disclosure.

FIG. 8 is a schematic diagram of eyewear to which the transmittance-variable device of the present disclosure is applied.

FIG. 9 is a view showing voltage versus transmittance characteristics of Example 1 of the present disclosure.

FIGS. 10 and 11 are views showing voltage versus transmittance characteristics of Comparative Examples 1 and 2 of the present disclosure, respectively.

FIG. 12 is the results of confirming the characteristics of Example 1 of the present disclosure.

FIGS. 13 and 14 are the results of confirming the characteristics of Examples 2 and 3 of the present disclosure, respectively.

DISCLOSURE

Technical Problem

The present disclosure is directed to a transmittance-variable device, and in one example, it is one object to provide a transmittance-variable device in which symmetry is secured in an omnidirectional viewing angle and a use thereof.

Technical Solution

The present disclosure relates to a transmittance-variable device. The term transmittance-variable device may mean a device designed to be capable of switching between a state of high transmittance and a state of low transmittance. As described below, in a structure which comprises at least two guest-host cells (hereinafter, GH cells), the switching between the states can be enabled by adjusting the orientation of the dichroic dye in each GH cell.

In the present disclosure, the state of high transmittance may be referred to as a transparent state, and the state of low transmittance may be referred to as a black state. For example, the transparent state may mean a state in which the linear light transmittance of the device for vertical light is 40% or more, and the black state may mean a state in which the linear light transmittance of the device for vertical light is 10% or less. Here, in the case where the transmittance-variable device is in the form of a film or a sheet, the vertical light is light incident in a direction parallel to the normal direction of the film or the sheet surface and the linear light transmittance of vertical light is a percentage of the light that is also transmitted in the direction parallel to the normal direction in the vertical light incident on the film or sheet surface.

In another example, the linear light transmittance of the vertical light in the transparent state may be about 100% or less, about 95% or less, 90% or less, 85% or less, 80% or less, 75% or less, 70% or less, 65% or less, or 60% or less, or may be 45% or more, 50% or more, or 55% or more. In another example, the linear light transmittance of the vertical light in the black state may be about 8% or less, 7% or less, 6% or less, or about 5.5% or less, and also may be 0% or more, 1% or more, 2% or more, 3% or more, or 4% or more.

The transmittance-variable device of the present disclosure can ensure symmetry even in an omnidirectional viewing angle as well as such a transmittance characteristic.

The transmittance may be a numerical value for light of any wavelength within a wavelength region of visible light, that is, a wavelength range of 400 to 700 nm, or an average value of numerical values for light of the entire wavelength.

The above-mentioned linear light transmittance in the transparent state is the transmittance in a state where the relevant transmittance of the transmittance-variable device is highest, and the linear transmittance in the black state is the transmittance in a state where the transmittance of the transmittance-variable device is lowest.

An exemplary transmittance-variable device can comprise a first GH cell and a second GH cell. In the present application, the term GH cell is a cell comprising a site containing a mixture of a host material and a dichroic dye guest material, which means a cell capable of adjusting the light transmittance by controlling the orientation of the dichroic dye guest in the mixture. Here, as the host material, a liquid crystal compound is generally applied. Hereinafter, in this specification, the host material, which is a liquid crystal compound, may be referred to as a liquid crystal host.

Also, the site containing a mixture of a host material and a dichroic dye guest material herein may be referred to as a GH layer. Thus, the first and second GH cells may comprise first and second GH layers, respectively.

In the present disclosure, the first and second GH layers are contained in the device in a state of being superimposed on each other. Accordingly, the light transmitted through the first GH layer can be incident on the second GH layer, and conversely, the light transmitted through the second GH layer can also be incident on the first GH layer.

FIG. 1 is a diagram schematically showing a state where the first GH layer (10) and the second GH layer (20) are superposed on each other as above. Such a structure herein may be referred to as a double cell structure. As shown in FIG. 1, a phase difference element (30) to be described below may exist between the first and second GH layers (10, 20).

In the present disclosure, the first and second GH layers may each comprise at least a liquid crystal compound. The liquid crystal compound may be included as a host material. As the liquid crystal compound, a suitable kind may be selected according to the application without any particular limitation. In one example, a nematic liquid crystal compound can be used as the liquid crystal compound. The liquid crystal compound may be a non-reactive liquid crystal compound. The non-reactive liquid crystal compound may mean a liquid crystal compound having no polymerizable group. Here, the polymerizable group may be exemplified by an acryloyl group, an acryloyloxy group, a methacryloyl group, a methacryloyloxy group, a carboxyl group, a hydroxyl group, a vinyl group or an epoxy group, and the like, but is not limited thereto, and may include known functional groups known as the polymerizable group.

The liquid crystal compound included in the GH layer may have positive dielectric constant anisotropy or negative dielectric anisotropy. In the present application, the term "dielectric constant anisotropy" may mean a difference between an extraordinary dielectric constant ($\varepsilon_e$) and an ordinary dielectric constant ($\varepsilon_o$) of the liquid crystal molecules. The dielectric constant anisotropy of the liquid crystal compound may be, for example, in a range within ±40, within ±30, within ±10, within ±7, within ±5 or within ±3. When the dielectric constant anisotropy of the liquid crystal compound is controlled within the above range, it may be advantageous in terms of driving efficiency of the liquid crystal element.

The refractive index anisotropy of the liquid crystal compound present in the GH layer can be appropriately selected in consideration of the target physical properties, for example, transmission characteristics of the transmittance-variable device, contrast ratios, and the like. The term "refractive index anisotropy" may mean a difference between an extraordinary refractive index and an ordinary refractive index of a liquid crystal compound. The refractive index anisotropy of the liquid crystal compound may be in a range of, for example, 0.1 or more, 0.12 or more or 0.15 or more to 0.23 or less or 0.25 or less or 0.3 or less.

Unless otherwise specified, the term refractive index herein is a refractive index based on light with a wavelength of about 550 nm.

Furthermore, among physical properties mentioned in this specification, when the measured temperature and/or pressure affects their physical property values, the relevant physical property means a physical property measured at normal temperature and/or normal pressure, unless otherwise specified.

In the present application, the term normal temperature is a natural temperature without warming or cooling, which may mean, for example, any one temperature in a range of about 10° C. to 30° C., or a temperature of about 25° C. or 23° C. or so.

In the present application, the term normal pressure is a pressure when it is not particularly reduced or increased, which may be usually one atmosphere or so such as atmospheric pressure.

The GH layer may further comprise a dichroic dye. The dye may be included as a guest material. The dichroic dye may serve, for example, to control the transmittance of the device depending on orientation of a host material. In the present application, the term "dye" may mean a material capable of intensively absorbing and/or deforming light in at least a part or all of the ranges within a visible light region, for example, within a wavelength range of 400 nm to 700 nm, and the term "dichroic dye" may mean a material capable of anisotropic absorption of light in at least a part or all of the ranges of the visible light region.

As the dichroic dye, for example, a known dye known to have properties that can be aligned depending on the alignment state of the liquid crystal compound by a so-called host guest effect can be selected and used. An example of such a dichroic dye includes a so-called azo dye, an anthraquinone dye, a methine dye, an azomethine dye, a merocyanine dye, a naphthoquinone dye, a tetrazine dye, a phenylene dye, a quaterrylene dye, a benzothiadiazole dye, a diketopyrrolopyrrole dye, a squaraine dye or a pyromethene dye, and the like, but the dye applicable in the present application is not limited thereto. As the dichroic dye, for example, a black dye can be used. Such a dye is known, for example, as an azo dye or an anthraquinone dye, and the like, but is not limited thereto.

As the dichroic dye, a dye having a dichroic ratio, that is, a value obtained by dividing the absorption of the polarized light parallel to the long axis direction of the dichroic dye by the absorption of the polarized light parallel to the direction perpendicular to the long axis direction, of 5 or more, 6 or more, or 7 or more, can be used. The dye may satisfy the dichroic ratio in at least a part of the wavelengths or any one wavelength within the wavelength range of the visible light region, for example, within the wavelength range of about 380 nm to 700 nm or about 400 nm to 700 nm. The upper limit of the dichroic ratio may be, for example, 20 or less, 18 or less, 16 or less, or 14 or less or so.

The ratio of the dichroic dye in the GH layer can be appropriately selected according to the target physical properties, for example, the transmittance variable characteristics. For example, the dichroic dye may be present in a ratio of 0.01 weight % or more, 0.1 weight % or more, 0.2 weight % or more, 0.3 weight % or more, 0.4 weight % or more, 0.5 weight % or more, 0.6 weight % or more, 0.7 weight % or more, 0.8 weight % or more, 0.9 weight % or more, or 1.0 weight % or more in the GH layer. The upper limit of the ratio of the dichroic dye in the GH layer may be, for example, 2 weight % or less, 1.9 weight % or less, 1.8 weight % or less, 1.7 weight % or less, 1.6 weight % or less, 1.5 weight % or less, 1.4 weight % or less, 1.3 weight % or less, 1.2 weight % or less, or 1.1 weight % or less.

The GH layer may further comprise optional addition materials used in the formation of a known GH layer, if necessary, in addition to the components.

The GH layers in the double cells may each have an anisotropy degree (R) of about 0.5 or more at the same time.

The anisotropy degree (R) is a value obtained from absorbance (E(p)) of the light beam polarized parallel to the alignment direction of the liquid crystal host and absorbance (E(s)) of the light beam polarized perpendicularly to the alignment direction of the liquid crystal host, which may be measured in the manner represented in the literature Polarized Light in Optics and Spectroscopy, D. S. Kliger et al., Academic Press, 1990.

In another example, the anisotropy degree (R) may be about 0.55 or more, 0.6 or more, or 0.65 or more. The anisotropy degree (R) may be, for example, about 0.9 or less, about 0.85 or less, about 0.8 or less, about 0.75 or less, or about 0.7 or less.

Such an anisotropy degree (R) can be achieved by controlling the kind of the GH cell, for example, the kind of the liquid crystal compound (host), the kind and the ratio of the anisotropic dye, or the thickness of the GH cell, and the like.

It is possible to provide a film with high contrast ratio by increasing the difference in the transmittance between the transparent state and the black state while using lower energy through the anisotropy degree (R) in the above range.

The first and second GH cells comprising each the GH layer may be superposed on each other to be included in the transmittance-variable device. The liquid crystal host in the GH layer may exist in an oriented state. Depending on the orientation of such a liquid crystal host, the dichroic dye guest may also be oriented. For example, each of the GH cells may have an optical axis. Here, the optical axis means, for example, the average alignment direction of the director of the liquid crystal host material. Here, the alignment direction of the director may mean, in the case of a rod-shaped liquid crystal compound such as a nematic liquid crystal compound, its long axis direction, and may mean, in the case of a disc-shaped compound such as a discotic liquid crystal, the normal direction of the relevant disc plane. The meaning of the optical axis in the GH cell and the manner of determining the relevant optical axis are known, and the known contents as above can be applied in the present application.

For example, the optical axis is usually determined according to the alignment direction of the alignment film, and it can be measured for the GH cell in the following manner. For example, it can be confirmed by disposing a linear polarizer in a state where a GH cell is horizontally oriented on one side of the GH cell and measuring the transmittance while rotating the polarizer 360 degrees. That is, while radiating the light to the GH cell or the linear polarizer side in this state, the direction of the optical axis can be confirmed by measuring the luminance (transmittance) at the other side. For example, when the transmittance is minimized in the process of rotating the polarizer 360 degrees, the angle that is perpendicular or vertical to the absorption axis of the polarizer may be defined as the direction of the optical axis.

In one example, the optical axes of the first and second GH cells in the transmittance-variable device may be vertical or parallel to each GH cell in a state of applying a voltage or a state of applying no voltage. That is, the liquid crystal host of the GH layer in the GH cell may be vertically oriented or horizontally oriented in a state of applying a voltage or no voltage.

In one example, the above-described black mode can be implemented when all the liquid crystal hosts of the two GH layers are horizontally oriented. The term vertical, orthogonal, horizontal or parallel in this specification mean substantially vertical, orthogonal, horizontal or parallel, and for example, the meaning of vertical or orthogonal includes the case where there is a deviation within ±10 degrees, within ±9 degrees, within ±8 degrees, within ±7 degrees, within ±6 degrees, within ±5 degrees, within ±4 degrees, within 13 degrees, within ±2 degrees, within ±1 degree, or within ±0.5 degrees from 90 degrees, and the meaning of horizontal or parallel includes the case where there is a deviation within ±10 degrees, within ±9 degrees, within ±8 degrees, within ±7 degrees, within ±6 degrees, within ±5 degrees, within ±4 degrees, within ±3 degrees, within ±2 degrees, within ±1 degree, or within ±0.5 degrees from 180 degrees. The fact that the optical axis is perpendicular to the GH cell may be the case where the angle formed by the surface of the GH cell and the optical axis is perpendicular or orthogonal and the fact that the optical axis is horizontal to the GH cell may mean that the surface of the GH cell and the optical axis are horizontal or parallel to each other.

In one example, in the black mode in which all the liquid crystal hosts of the two GH layers are horizontally oriented, the optical axes of the liquid crystal hosts of the first and second GH layers may be parallel to each other when observed in the normal direction of the GH layer plane. In addition, the tilt directions of the horizontally oriented liquid crystal hosts in the black mode may be crossed with each other when observed in a direction perpendicular to the normal direction (i.e., when observed from the side). That is, the tilt direction of the liquid crystal host of the first GH layer and the tilt direction of the liquid crystal host of the second GH layer cross each other. Upon the side observation, the transmittance-variable device can also be observed in various directions, where the crossed tilt directions can be confirmed at the time of lateral observation in at least one direction among these directions.

Here, the observation in the normal direction of the GH layer plane means, for example, in the case of a film or sheet-shaped GH layer, a case of observing in the thickness direction, that is, in the direction of the shortest distance connecting the main surface and the main surface.

FIG. 2 shows the arrangement of the optical axis (dotted line) of the first GH layer and the optical axis (solid line) of the second GH layer when observed in the thickness direction, and both are approximately parallel as shown in the drawing.

Here, the observation in a direction perpendicular to the normal direction of the GH layer plane means, for example, in the case of a film or sheet-shaped GH layer, a case of observing in a direction perpendicular to the thickness direction, that is, from the side.

FIG. 3 is a case where the first GH cell (10) and the second GH cell (20) that are overlapped to each other are observed from the side, and in this case, the tilt direction (solid line) of the liquid crystal host of the first GH cell (10) and the tilt direction (dotted line) of the second GH cell (20) cross to each other, as shown in FIG. 3.

In FIG. 3, the above-described phase difference element (30) and alignment films (41, 42, 43, 44) are also shown together.

Through the above orientation, a device can be realized in which the symmetry of the viewing angle in all directions is ensured.

For example, when the optical axis of the GH cell is orthogonal to the GH cell in a state of applying no voltage, such an oriented state can be realized while the optical axis is oriented parallel to the GH cell by voltage application, and on the contrary, when the optical axis of the GH cell is parallel to the GH cell in a state of applying no voltage, the optical axis may be oriented by voltage application so that the optical axis is orthogonal to the GH cell, while maintaining the oriented state. In the case where the liquid crystal host is vertically oriented upon applying no voltage as above, an element of a so-called normally transparent mode is realized, and in the case where the liquid crystal host is horizontally oriented upon applying no voltage, an element of a normally black mode is realized. It can be determined depending on the type of the liquid crystal host to be used, the alignment film and/or the position of the electrode layer whether the transmittance-variable device is designed in the normally transparent mode or the normally black mode.

As shown in FIG. 3, the smallest angle of angles formed by the tilt directions of the first and second GH layers crossing to each other may be in a range of 0.5 degrees to 10 degrees. In another example, the angle may be 1 degree or more, 2 degrees or more, 3 degrees or more, 4 degrees or more, or 5 degrees or more, or may be 9 degrees or less, 8 degrees or less, 7 degrees or less, or 6.5 degrees or less or so.

Here, the smallest angle of the angles formed by the crossed tilt directions means a smallest angle (A) of the angles formed by the two tilt directions crossed each other, for example, as shown in FIG. 4. In this specification, the manner of measuring the angle (A) is not particularly limited. For example, after confirming the tilt angle upon the horizontal orientation of the liquid crystal host with respect to the individual GH layer or GH cell, the angle can be obtained through the values confirmed for both of GH layers or GH cells. At this time, the method of confirming the tilt angle with respect to the individual GH layer or GH cell is known, where for example, a method such as a crystal rotation method can be applied and in another example, a method of confirming the tilted angle by converting the phase difference or transmittance in the polar angle direction along the alignment direction (rubbing direction, etc.) of the alignment film is also possible.

In the present application, the method of implementing the oriented state as above is not particularly limited, and for example, the oriented state can be implemented by utilizing a known method known to give a tilt angle when the liquid crystal host is oriented horizontally.

For example, as shown in FIG. 3, the first and second GH cells may comprise two alignment films (41, 42, 43, 44) disposed on both sides of the first GH layer (10) and the second GH layer (20), and in this case, the arrangement can be achieved by adjusting the state of the alignment films.

For example, when each of the alignment films (41, 42, 43, 44) is a rubbing alignment film, the oriented state as above can be realized in the case of using, as the alignment films (42, 43) existing between the first and second GH layers (10, 20), alignment films rubbed in the same direction to each other and using, as the alignment film (41) existing in the opposite direction to the second GH layer (20) based on the first GH layer (10) and the alignment film (44) existing in the opposite direction to the second GH layer (10) based on the second GH layer (20), alignment films rubbed in a direction opposite to the alignment direction of the alignment films (42, 43) existing between the first and second GH layers (10, 20). In FIG. 3, such rubbing directions of the respective alignment films (41, 42, 43, 44) are indicated by arrows in the respective alignment films.

Hereinafter, the respective alignment films (41, 42, 43, 44) may be referred to as a first alignment film (41), a second alignment film (42), a third alignment film (43) and a fourth alignment film (44) for convenience.

For example, when each of the alignment films (41, 42, 43, 44) is a photo-alignment film, as the photo-alignment film, the obliquely irradiated photo-alignment film is used, but the oriented state as above can be realized in the case of using, as the alignment films (42, 43) existing between the first and second GH layers (10, 20), alignment films obliquely irradiated in the same direction to each other and using, as the alignment film (41) existing in the opposite direction to the second GH layer (20) based on the first GH layer (10) and the alignment film (44) existing in the opposite direction to the second GH layer (10) based on the second GH layer (20), alignment films obliquely irradiated in a direction opposite to the obliquely irradiated direction of the alignment films (42, 43) existing between the first and second GH layers (10, 20). The method of imparting a tilt angle at the time of horizontal orientation through the obliquely irradiated photo-alignment film is known, and all of these methods can be applied to the present invention.

In such methods, it is possible to achieve the above-described arrangement structure by controlling the intensity of the rubbing or the inclination angle and/or the irradiation amount at the time of oblique irradiation.

On the other hand, in one example, when the liquid crystal host of the GH layer is vertically oriented, the liquid crystal host may be designed to have a pretilt angle within a predetermined range.

That is, the optical axis of the cell may be designed so as to have a pretilt angle and a pretilt direction within a predetermined range in a state where the optical axis is perpendicular to each GH cell, that is, in a state where the liquid crystal host in the GH cell is vertically oriented.

The pretilt angle of the liquid crystal host may mean the angle formed by the direction of the director of the above-described liquid crystal host with the plane of the GH layer.

In one example, the pretilt angle may be in a range of about 70 degrees to 90 degrees. Here, when the pretilt angle is 90 degrees, it may mean a state where the liquid crystal host is substantially completely vertically oriented.

The pretilt direction of the first GH cell and the pretilt direction of the second GH cell may be approximately parallel to each other when the liquid crystal hosts of the first and second GH cells all have a pretilt angle of less than 90 degrees.

The pretilt direction may mean the direction in a state where the pretilted liquid crystal host is projected on the GH layer plane.

The method of controlling the pretilt angle and direction of the liquid crystal host in the GH cell as above is not particularly limited, where they can be controlled using, for example, the above-described alignment film.

That is, in one example, the pretilt angle and the pretilt direction can be adjusted through control of the alignment direction of the alignment film in the transmittance-variable device of the present application.

The pretilt angle may mean an angle formed by the director of the liquid crystal molecules with respect to a plane horizontal to the surface of the alignment film, the GH layer or the GH cell (hereinafter, the alignment film and the like), or an angle formed with the surface normal direction of the alignment film and the like.

In this specification, the pretilt angle of the alignment film can be used in the same meaning as the pretilt angle of the liquid crystal host, and the pretilt direction of the alignment film can be used in the same meaning as the pretilt direction of the liquid crystal host.

In one example, the first to fourth alignment films may have a pretilt angle in a range of 70 degrees to 90 degrees, or 70 degrees or more but less than 90 degrees. When the pretilt angle is in the above range, it is possible to provide a transmittance-variable device having excellent initial transmittance. In one example, the pretilt angle may be about 71 degrees or more, about 72 degrees or more, about 73 degrees or more, about 74 degrees or more, about 75, about 76, about 77, about 78 degrees or more, about 79 degrees or more, about 80 degrees or more, about 81 degrees or more, about 82 degrees or more, about 83 degrees or more, about 84 degrees or more, about 85 degrees or more, about 86 degrees or more, or about 87 degrees or more, and may be about 88.5 degrees or less, or about 88 degrees or less.

In one example, the pretilt angle of the first alignment film may be an angle measured in a clockwise or counterclockwise direction based on the horizontal plane of the alignment film or the like, and the pretilt angle of the second alignment film may be an angle measured in the reverse direction, that is, the counterclockwise direction when the pretilt angle of the first alignment film is measured in the clockwise direction or the clockwise direction when the pretilt angle of the first alignment film is measured in the counterclockwise direction, or may be an angle measured in the same direction.

Also, the pretilt angle of the third alignment film may be an angle measured in a clockwise or counterclockwise direction based on the horizontal plane of the alignment film or the like, and the pretilt angle of the fourth alignment film may be an angle measured in the reverse direction, that is, the counterclockwise direction when the pretilt angle of the third alignment film is measured in the clockwise direction or the clockwise direction when the pretilt angle of the third alignment film is measured in the counterclockwise direction, or may be an angle measured in the same direction.

The pretilt direction may mean a direction in which the director of the liquid crystal molecules is projected on the horizontal plane of the alignment film.

The pretilt direction of the first and second alignment films and the pretilt direction of the third and fourth alignment films may be horizontal to each other.

In one example, the pretilt angle and direction as mentioned above may be the pretilt angle and direction measured in each GH layer in the case where the GH layer of each GH cell is in a vertical orientation state.

In the description as described above, each of the alignment films (41, 42, 43, 44) may be a rubbing alignment film or a photo-alignment film. In the case of the rubbing alignment film, the alignment direction is determined by the rubbing direction, and in the case of the photo-alignment film, it is determined by the polarization direction of the irradiated light. The pretilt angle and the pretilt direction of the alignment film may be realized by adjusting orientation conditions, for example, a rubbing condition or a pressure condition upon rubbing orientation, or optical orientation conditions, for example, a polarizing state of light, an irradiation angle of light, an irradiation intensity of light and the like appropriately.

For example, when the alignment film is a rubbing alignment film, the pretilt angle can be achieved by controlling the rubbing intensity of the rubbing alignment film or the like, and the pretilt direction can be achieved by controlling the rubbing direction of the rubbing alignment film, where this method of achievement is a known method. Furthermore, in the case of the photo-alignment film, they can be achieved by the alignment film material, the direction, state or intensity of the polarized light applied to the orientation.

In the case of using a rubbing alignment film, the rubbing directions of the first and second alignment films may be opposite to each other, as described above, and the rubbing directions of the third and fourth alignment films may also be opposite to each other.

The rubbing direction can be confirmed through the measurement of the pretilt angle, where since the liquid crystals generally lie along the rubbing direction and generates the pretilt angle, it is possible to measure the rubbing direction by measuring the pretilt angle.

By setting the pretilt angle and the direction as above, it is possible to implement a device having symmetric viewing angle characteristics in all directions, while realizing higher transmittance in the transparent state and lower transmittance in the black state.

In the transmittance-variable device of the present application, the specific configuration of each GH cell is not particularly limited as long as the GH layer is included in such a configuration.

The transmittance-variable device of the present application comprises at least two GH cells as above, and further comprises a phase difference element disposed between the two GH cells. Accordingly, in the transparent mode, the light may sequentially penetrate the first GH cell, the phase difference element and the second GH cell, or may sequentially penetrate the second GH cell, the phase difference element and the first GH cell.

The specific kind of the phase difference element which can be applied in the present application is not particularly limited. In one example, as the phase difference element, a phase difference element having a $\lambda/2$ phase delay characteristic can be used. Here, the phase difference element having a $\lambda/2$ phase delay characteristic is an element that if linearly polarized light is incident, the incident light can be converted into linearly polarized light which is approximately orthogonal or orthogonal to the incident light and emitted. The phase difference element may have, for example, a plane phase difference for light with a wavelength of about 550 nm in a range of 200 nm to 350 nm or in a range of 220 nm to 320 nm. Here, the plane phase difference of the phase difference element is a value ($d \times (n_x - n_y)$) obtained by multiplying the difference ($n_x - n_y$) between the refractive index ($n_x$) of the slow axis direction and the refractive index ($n_y$) of the fast axis direction in the phase difference element by the thickness (d).

On the other hand, the phase difference element may have a thickness direction phase difference for light with a wavelength of 550 nm in a range of −300 nm to 300 nm. The thickness direction phase difference of the phase difference element is a value ($d \times (n_z - n_y)$) obtained by multiplying the difference ($n_z - n_y$) between the refractive index ($n_z$) of the thickness direction and the refractive index ($n_y$) of the fast axis direction in the phase difference element by the thickness (d) of the relevant phase difference element. In another example, the thickness direction phase difference may be −280 nm or more, −260 nm or more, −240 nm or more, −220 nm or more, −200 nm or more, −180 nm or more, −160 nm or more, −140 nm or more, −120 nm or more, −100 nm or more, −80 nm or more, −60 nm or more, −40 nm nm or more, −20 nm or more, −10 nm or more, −5 nm or more, 0nm or more, 20 nm or more, 40 nm or more, 60 nm or more, 80 nm or more, or 90 nm or more, or may be 280 nm or less, 260 nm or less, 240 nm or less, 220 nm or less, 200 nm or less, 180 nm or less, 160 nm or less, 140 nm or less, 120 nm or less, 100 nm or less, 80 nm or less, 60 nm or less, 40 nm or less, 20 nm or less, O1 nm or less, or 5 nm or less or so.

The phase difference element may have a single layer structure or a laminated structure of two or more layers as long as it has the above phase difference range.

Also, the wavelength dispersion characteristic of the phase difference element may also have normal wavelength dispersion, flat wavelength dispersion or reverse wavelength dispersion characteristics.

The phase difference element may be disposed so that when the optical axis of the GH cell is horizontal with respect to the GH cell, the slow axis direction is in a range of about 35 degrees to about 55 degrees, in a range of about 40 degrees to about 50 degrees, or about 45 degrees with the optical axis. It is possible to provide a transmittance-variable device capable of varying the transmittance according to the relationship between the slow axis of the phase difference element and the optical axis of the GH cell as described above, and particularly securing a high contrast ratio even upon observation in the oblique direction.

In the present application, the specific kind of the phase difference element is not particularly limited as long as it has the plane phase difference as above, that is, the λ/2 phase delay characteristic, which may be a single layer or have a laminated structure of two or more layers. For example, the element having the λ/2 phase delay characteristic may also be realized by laminating two sheets of elements having a λ/4 phase delay characteristic. When the phase difference element exhibits the λ/2 phase delay characteristic while having a laminated structure of two or more layers, the slow axis directions of the respective layers in the laminated structure may be parallel or not parallel to each other, but they may be set to directions in which the polarizing direction of the linearly polarized light penetrating the first or second GH layer as a whole can be rotated by 90 degrees and penetrated.

In one example, the phase difference element may be a non-liquid crystal polymer film or a liquid crystal polymer film. Here, the liquid crystal polymer film is a film prepared by orienting and polymerizing a reactive liquid crystal compound known as RM (reactive mesogen) and the non-liquid crystal polymer film is a polymer film having optical anisotropy other than the liquid crystal polymer film, which may mean a polymer film exhibiting optical anisotropy through a process such as uniaxial or biaxial stretching. Such a non-liquid crystal polymer film can be exemplified by a TAC (triacetyl cellulose) film; a COP (cycloolefin copolymer) film such as norbornene derivatives; an acrylic film such as polymethyl methacrylate (PMMA); a polyester film such as a PC (polycarbonate) film or a PET (polyethyleneterephthalate) film; an olefin film such as PE (polyethylene) or PP (polypropylene); a PVA (polyvinyl alcohol) film; a DAC (diacetyl cellulose) film; a Pac (polyacrylate) film; a PES (polyether sulfone) film; a PEEK (polyetheretherketone) film; a PPS (polyphenylsulfone) film, a PEI (polyetherimide) film; a PEN (polyethylenemaphthatate) film; a PI (polyimide) film; a PSF (polysulfone) film; or a PAR (polyarylate), and the like, but is not limited thereto.

The transmittance-variable device of the present application can be realized in various structures as long as it comprises the GH cell including the first and second GH layers and the phase difference element, as described above.

In one example, the transmittance-variable device may comprise first and second substrates disposed to face each other, and third and fourth substrates disposed to face each other. Such a case is shown in FIG. 5. As in FIG. 5, in the transmittance-variable device comprising the first to fourth substrates (101, 102, 103, 104) as above, the first GH layer (10) may be present between the first substrate (101) and the second substrate (102), and the second GH layer (20) may be present between the third substrate (103) and the fourth substrate (104). In the above structure, the second substrate (102) and the third substrate (103) may be arranged to face each other. As shown in FIG. 6, in the structure of FIG. 5, the above-described phase difference element may exist between the second and third substrates (102, 103). In another example, in the structure shown in FIG. 5, the second substrate (102) and the third substrate (103) together may also constitute the phase difference element, without any separate phase difference element. In this case, the second and third substrates (102, 103) are each a substrate exhibiting a λ/4 wavelength phase delay characteristic, where such two substrates may be laminated on each other to form a layer exhibiting the λ/2 phase delay characteristic. In the structure as in FIG. 6, the second and third substrates (102, 103) may be isotropic substrates.

In the structure shown in FIGS. 5 and 6, the sum of the plane phase differences of the second and third substrates (102, 103) existing between the first GH layer (10) and the second GH layer (20) or the sum of the plane phase differences of the second and third substrates (102, 103) and the phase difference element (30) may be in the range capable of exhibiting the above-described λ/2 phase delay characteristic. Here, the sum of the plane phase differences means an optical sum.

In another example, the transmittance-variable device comprises a first substrate (101), a second substrate (102) and a third substrate (103) sequentially arranged as shown in FIG. 7, where the first GH layer (10) may be present between the first and second substrates (101, 102) and the second GH layer (20) may be present between the second and third substrates (102, 103). As shown in FIG. 7, this case is a structure that two GH cells share one substrate (the second substrate (102)). In the case of this structure, the second substrate shared can exhibit the above-described λ/2 phase delay characteristic.

The transmittance-variable device may consist of various structures in addition to the above-exemplified structure as long as the phase difference element as described above can exist between two superimposed GH layers, if possible.

In the above-described structure, a known material can be used as the substrate without any particular limitation. For example, as the substrate, a glass film, a crystalline or amorphous silicon film, an inorganic film such as quartz or ITO (indium tin oxide) film or a plastic film, and the like can be used.

As the plastic substrate, a TAC (triacetyl cellulose) substrate; a COP (cycloolefin copolymer) substrate such as a norbornene derivative substrate; a PMMA (poly(methyl methacrylate)) substrate; a PC (polycarbonate) substrate; a PE (polyethylene) substrate; a PP (polypropylene) substrate; a PVA (polyvinyl alcohol) substrate; a DAC (diacetyl cellulose) substrate; a Pac (polyarylate) substrate; a PES (polyether sulfone) substrate; a PEEK (polyetheretherketone) substrate; a PPS (polyether sulfone), PEI (polyetherimide) substrate; a PEN (polyethylenemaphthatate) substrate; a PET (polyethyleneterephtalate) substrate; a PI (polyimide) substrate; a PSF (polysulfone) substrate; a PAR (polyarylate) substrate or a substrate including an amorphous fluororesin or the like can be used, without being limited thereto. The thickness of such a substrate is not particularly limited, which can be selected within an appropriate range.

An electrode layer may be present on the substrate. For example, the electrode layer may exist on at least one surface of the surfaces facing the GH layer in the surfaces of the substrates included in the transmittance-variable device, for example, at least one surface of the four inner surfaces of the first to fourth substrates in the structure of FIGS. 5 and 6, or any one surface of the inner surfaces of the first and third substrates (101, 103) and both side surfaces of the second substrate (102) in the structure of FIG. 7. In the present application, the term inner surface of the substrate means a surface close to the GH layer among both surfaces of the substrate.

In one example, the electrode layer may exist on at least any one surface of the inner surface of the first substrate (101) and the inner surface of the second substrate (102) and at least any one surface of the inner surface of the third substrate (103) and the inner surface of the fourth substrate (104) in the structure of FIGS. 5 and 6, and if necessary, the electrode layer may exist on all the inner surfaces of the first to fourth substrates so that a vertical electric field can be applied to each GH cell. Also, in the structure of FIG. 7, the electrode layer may exist on at least any one surface of the inner surface of the first substrate (101) and the surface of the second substrate (102) facing the first GH layer (10) and at least any one surface of the inner surface of the third substrate (103) and the surface of the second substrate (102) facing the second GH layer (20), and if necessary, the electrode layer may exist on all the inner surfaces of the first and third substrates and both side surfaces of the second substrate so that a vertical electric field can be applied to each GH cell.

The electrode layer may be formed using a known material, and for example, the electrode layer may comprise a conductive polymer, a conductive metal, a conductive nanowire, or a metal oxide such as ITO (indium tin oxide), and the like. The electrode layer may be formed to have transparency. In this field, various materials and forming methods capable of forming a transparent electrode layer are known, and all of these methods can be applied. If necessary, the electrode layer formed on the surface of the substrate may also be appropriately patterned.

A liquid crystal alignment layer, which is the above-described alignment layer, may exist on the substrate. The liquid crystal alignment layer may also be formed on the inner surface of the substrate, that is, the surface facing the GH layer. When the above-mentioned electrode layer is present on the substrate, the liquid crystal alignment layer may also be formed on the surface of the electrode layer or between the electrode layer and the substrate. For example, the liquid crystal alignment layer may exist on at least one surface of the inner surfaces of the substrates included in the transmittance-variable device, for example, at least one surface of the four inner surfaces of the first to fourth substrates in the structure of FIGS. 5 and 6, or any one surface of the inner surfaces of the first and third substrates (101, 103) and both side surfaces of the second substrate (102) in the structure of FIG. 7.

In one example, the liquid crystal alignment layer may exist on at least any one surface of the inner surface of the first substrate (101) and the inner surface of the second substrate (102) and at least any one surface of the inner surface of the third substrate (103) and the inner surface of the fourth substrate (104) in the structure of FIGS. 5 and 6, and if necessary, the liquid crystal alignment layer may exist on all the inner surfaces of the first to fourth substrates. Also, in the structure of FIG. 7, the liquid crystal alignment layer may exist on at least any one surface of the inner surface of the first substrate (101) and the surface of the second substrate (102) facing the first GH layer (10) and at least any one surface of the inner surface of the third substrate (103) and the surface of the second substrate (102) facing the second GH layer (20), and if necessary, the liquid crystal alignment layer may also exist on all the inner surfaces of the first and third substrates and both side surfaces of the second substrate.

As the alignment layer, various horizontal alignment layers or vertical alignment layers known in this field can be applied without particular limitation, as described above.

The transmittance-variable device may comprise other necessary elements in addition to the GH cell and the phase difference element as described above. Such elements can be exemplified by antireflection layers or hard coating layers, and the like, but is not limited thereto.

The transmittance-variable device as above can be applied to various applications. The applications to which the transmittance-variable device can be applied can be exemplified by openings in enclosed spaces including buildings, containers or vehicles, and the like, such as windows or sunroofs, or eyewear, and the like. Here, in the range of eyewear, all eyewear formed so that an observer can observe the outside through lenses, such as general glasses, sunglasses, sports goggles or helmets, or instruments for experiencing augmented reality, can be included.

A typical application to which the transmittance-variable device of the present application may be applied is eyewear. Recently, sunglasses, sports goggles, augmented reality experience devices, and the like are commercially available as eyewear in the form in which lenses are mounted so as to be inclined to an observer's frontal line of sight. In the case of the transmittance-variable device of the present application, a high contrast ratio can be ensured even at an inclination angle, as described above, and thus it can be effectively applied to eyewear having the above structure.

When the transmittance-variable device of the present application is applied to eyewear, the structure of the eyewear is not particularly limited. That is, the transmittance-variable device may be mounted and applied in a lens for a left eye and/or a right eye having a known eyewear structure.

For example, the eyewear may comprise a left eye lens and a right eye lens; and a frame for supporting the left eye lens and the right eye lens.

FIG. 8 is an exemplary schematic diagram of the eyewear, which is a schematic diagram of the eyewear comprising the frame (12) and the left and right eye lenses (14), and the eyewear structure to which the transmittance-variable device of the present application can be applied is not limited to FIG. 8.

In the eyewear, the left eye lens and the right eye lens may each comprise the transmittance-variable device. Such a lens may comprise only the transmittance-variable device, or may also comprise other configurations.

The eyewear may have various designs, and for example, the frame may be formed to be inclined so that when an observer wears the eyewear, the angle formed by the observer's front sight line direction and the normal of the surface of the transmittance-variable device is in a range of 15 degrees to 40 degrees. Such eyewear can be exemplified by sports goggles or augmented reality experience devices, and the like.

Advantageous Effects

The transmittance-variable device of the present application can switch between a transparent state and a black state, can exhibit high transmittance in the transparent state and a high shielding rate in the black state, and can exhibit a high contrast ratio even at the inclination angle and exhibit symmetric viewing angle characteristics in all directions. Such a transmittance-variable device of the present application can be applied to various applications including various architectural or automotive materials which need to adjust the transmittance, or eyewear such as goggles for augmented reality experience or sports, sunglasses or helmets.

EXPLANATION OF REFERENCE NUMERALS

10: first GH layer
20: second GH layer
30: phase difference element
41, 42, 43, 44: alignment film, alignment layer
101, 102, 103, 104: substrate
14: left eye or right eye lens
12: frame

MODE FOR INVENTION

Hereinafter, the transmittance-variable device of the present application will be described in detail by way of examples and comparative examples, but the scope of the present application is not limited by the following transmittance-variable device.

Example 1

A first GH cell was produced by forming a GH layer between two COP (cycloolefin polymer) films in which an ITO (indium tin oxide) electrode layer and a vertical alignment film were sequentially formed on the surface. Here, the cell gap of the GH cell was set to about 12 μm. Here, as the vertical alignment film, an alignment film having a pretilt angle of about 89 degrees was used. The alignment film was formed to a thickness of about 200 nm by coating a polyimide-based vertical alignment film on the ITO electrode layer by bar coating, holding the film at 130° C. for about 30 minutes and then rubbing the film with a rubbing cloth. At this time, the two COP films were laminated so that the rubbing directions of the alignment films on the films were opposite to each other. Also, the GH layer was formed by applying a GH mixture in which nematic liquid crystals having dielectric constant anisotropy of about −4.9 and refractive index anisotropy of about 0.132 as a liquid crystal compound and a black dye having a dichroic ratio of about 6.5 to 8 as a dichroic dye were mixed in a weight ratio of 98.7:1.3 (nematic liquid crystal:dichroic dye). A second GH cell prepared in the same manner as above and the first GH cell were superposed as in FIG. 3, and a COP (cycloolefin polymer) film having a plane phase difference of about 275 nm for a wavelength of 550 nm was placed therebetween to produce a transmittance-variable element. At this time, as the COP (cycloolefin polymer) film, a film having a reverse wavelength characteristic and having a ratio (Re (450)/Re (550)) of a plane phase difference (Re (450)) for light with a wavelength of 450 nm to a plane phase difference (Re (550)) for light with a wavelength of 550 nm of about 0.8 or so was applied. As shown in FIG. 3, the alignment films (42, 43) existing between the first GH layer (10) and the second GH layer (20) were laminated so that their rubbing directions were the same to each other. The device is of a type in which the liquid crystal hosts of the first and second GH cells are in a vertical orientation state upon applying no voltage and the liquid crystal hosts are horizontally oriented when a voltage is applied. Also, as shown in FIG. 3, the tilt directions of the respective liquid crystal hosts of the first and second GH layers (10, 20) in the horizontal orientation crossed each other when observed from the side, and at this time, the angle (A) shown in FIG. 4 was about 6 degrees or so. Here, the angle that the tilt directions crossed each other was confirmed by confirming the tilt angle with respect to the single GH layer and then summing the tilt angles confirmed in the two GH layers. The method of confirming the tilt angle with respect to the single GH layer was known, and it was confirmed according to the known crystal rotation method in this example. Furthermore, the slow axes of the COP films were approximately 45 degrees with the optical axes of the horizontally aligned liquid crystal hosts.

Example 2

A transmittance-variable element was manufactured in the same manner as in Example 1, except that as the phase difference element (30 in FIG. 3) introduced between the first and second GH cells, a laminated film of a COP (cycloolefin polymer) film having a plane phase difference of about 275 nm for a wavelength of 550 nm and having a flat wavelength characteristic and Nz (=(nx−nz)/(nx−ny), wherein nx is a refractive index in the slow axis direction, ny is a refractive index in the fast axis direction, and nz is a refractive index in the thickness direction) of about 1.2 and a vertical alignment liquid crystal layer having a thickness direction phase difference (Rth=dx(nz−ny)) in a range of about 180 to 200 nm was placed.

Example 3

A transmittance-variable element was manufactured in the same manner as in Example 1, except that as the phase difference element (30 in FIG. 3) introduced between the first and second GH cells, a laminated film of a COP (cycloolefin polymer) film from having a plane phase difference of about 275 nm for a wavelength of 550 nm and having a reverse wavelength characteristic and a ratio (Re (450)/Re (550)) of a plane phase difference (Re (450)) for light with a wavelength of 450 nm to a plane phase difference (Re (550)) for light with a wavelength of 550 nm of about 0.8 or so and a vertical alignment liquid crystal layer having a thickness direction phase difference (Rth=dx(nz−ny)) of about 100 nm or so was placed.

Comparative Example 1

An element was manufactured in the same manner as in Example 1, except that when the optical axes of the first and second GH layers were horizontally oriented at the time of bonding the GH cells together, they were bonded together so as to cross each other at approximately 90 degrees, and a COP (cycloolefin polymer) film having a plane phase difference of about 275 nm was not placed between the GH cells.

Comparative Example 2

A transmittance-variable device was manufactured in the same manner as in Example 1, except that the COP film as the phase difference element was not applied and the GH cells were laminated such that the optical axes of the respective liquid crystal hosts were perpendicular to each other when both of the first and second GH cells were oriented horizontally. As a result of confirming the optical axes of the first and second GH cells at the time of horizontal orientation for such an element, both tilted in the same direction to each other and did not cross.

Test Example 1

The transmittance-variable devices produced in Example 1 and Comparative Examples 1 and 2 were irradiated with light of a DC65 light source to evaluate linear light transmittance. When the right horizontal direction was set to 0 degrees and the left horizontal direction was set to 180 degrees, from the center of the transmittance-variable device, the transmittance in the center direction (front), the 0 degree direction, the 90 degree direction, the 180 degree direction and the 270 degree direction was measured to measure the transmittance of all the front and left, right, top and bottom directions. At this time, the polar angle was set to 0 degrees upon the measurement of the front transmittance, and the polar angle was set to 23 degrees upon the measurement of the other transmittance.

All the devices of Example and Comparative Examples were in a normally transparent mode exhibiting high transmittance in a state of applying no voltage, the transmittance decreased with applying a voltage, and the minimum transmittance was exhibited upon applying a voltage of about 28V. The transmittance and the contrast ratios of the respective devices according to the applied voltages are summarized in the following table. Table 1 below shows the measurement results for Example 1, and Tables 2 and 3 show the measurement results for Comparative Examples 1 and 2, respectively. The contrast ratio (CR) is a ratio (Tc/T) of the maximum transmittance (Tc) to the minimum transmittance (T) that is confirmed when the transmittance has been measured while varying the application amount of voltage.

FIGS. 9 to 11 are views showing voltage versus transmittance characteristics of Example 1 and Comparative Examples 1 and 2, respectively.

TABLE 1

| Applied Voltage | Front Transmittance | 0 degree Transmittance | 180 degree Transmittance | 90 degree Transmittance | 270 degree Transmittance |
|---|---|---|---|---|---|
| 0 V | 57% | 47.4% | 47.0% | 47.5% | 47.4% |
| 28 V | 4.9% | 4.7% | 4.7% | 5.0% | 5.0% |
| CR | 11.6 | 10.1 | 10 | 9.5 | 9.5 |

TABLE 2

| Applied Voltage | Front Transmittance | 0 degree Transmittance | 180 degree Transmittance | 90 degree Transmittance | 270 degree Transmittance |
|---|---|---|---|---|---|
| 0 V | 52.8% | 43.8% | 43.5% | 41.8% | 45.4% |
| 28 V | 2.9% | 2.8% | 2.8% | 3.1% | 3.5% |
| CR | 18.2 | 15.6 | 15.5 | 13.5 | 13 |

TABLE 3

| Applied Voltage | Front Transmittance | 0 degree Transmittance | 180 degree Transmittance | 90 degree Transmittance | 270 degree Transmittance |
|---|---|---|---|---|---|
| 0 V | 48.7% | 40.2% | 40% | 37.4% | 42.8% |
| 28 V | 3.9% | 5% | 3% | 3.7% | 4.1% |
| CR | 12.5 | 8 | 13.3 | 10.1 | 10.4 |

From the above results and the results of FIGS. 9 to 11, it can be seen that in this example, the equivalent level of transmittance characteristics on the left, right, top and bottom are exhibited at the inclination angles, the voltage versus transmittance graphs are also shown at the same level, and no gradation inversion has occurred.

On the other hand, in the case of Comparative Example 1, the right and left transmittance and the voltage versus transmittance graphs at the inclination angles are the same level, but the top and bottom transmittance characteristics and the voltage versus transmittance graphs are different and the gradation inversion has occurred at the lower viewing angle.

Also, in the case of Comparative Example 2, the left, right, top and bottom transmittance at the inclination angles and the voltage versus transmittance graphs are all different, and the gradation inversion has occurred at the lower viewing angle.

On the other hand, FIG. 12 is a graph showing the results of evaluating the viewing angle characteristics of Example 1, and it can be confirmed from this that in the case of Example 1, the symmetry is stably secured in the vertical and horizontal directions.

Test Example 2

FIGS. 13 and 14 are graphs showing the results of evaluating the viewing angle characteristics of Examples 2 and 3, respectively, and it can be confirmed from this that more symmetrical viewing angle characteristics can be realized through the introduction of the additional compensation structure (vertical alignment liquid crystal layer).

The invention claimed is:

1. A transmittance-variable device, comprising:
   a first guest host layer; and
   a second guest host layers,
   wherein the first and second guest host layers are superposed,
   wherein each of the first and second guest host layers comprise a liquid crystal host and a dichroic dye guest,
   wherein the device is configured to be switched between a transparent mode and a black mode,
   wherein, in the black mode, each of the liquid crystal hosts in the first and second guest host layers is horizontally oriented and the optical axes of the liquid crystal hosts in the first and second guest host layers are parallel to each other when observed in a normal direction to a guest host layer plane, and
   wherein, in the black mode, the tilt directions of the liquid crystal hosts in the first and second guest host layers are crossed with each other when observed in a direction perpendicular to the normal direction.

2. The transmittance-variable device according to claim 1, wherein, in the black mode, the smallest angle of angles formed by the crossed tilt directions when observed in the direction perpendicular to the normal direction is in a range of 0.5 degree to 10 degrees.

3. The transmittance-variable device according to claim 1, wherein, in the transparent mode, the optical axes of the liquid crystal hosts in the first and second guest host layers are vertically oriented and have a pretilt angle in a range of 70 degrees to 90 degrees.

4. The transmittance-variable device according to claim 1, further comprising: alignment films disposed on both sides of each of the first and second guest host layers.

5. The transmittance-variable device according to claim 4, wherein the alignment films are rubbing alignment films,
   wherein the alignment films disposed between the first and second guest host layers are rubbed in the same direction to each other, and wherein the alignment film disposed on a side of the first guest host layer facing a direction opposite to the second guest host layer and the alignment film disposed on a side of the second guest host layer facing a direction opposite to the first guest host layer are rubbed in a direction opposite to the rubbing direction of the alignment films disposed between the first and second guest host layers.

6. The transmittance-variable device according to claim 4, wherein the alignment films are obliquely irradiated photo-alignment films,
wherein the alignment films disposed between the first and second guest host layers are obliquely irradiated in the same direction to each other, and
wherein the alignment film disposed on a side of the first guest host layer facing a direction opposite to the second guest host layer and the alignment film disposed on a side of the second guest host layer facing a direction opposite to the first guest host layer are obliquely irradiated in a direction opposite to the obliquely irradiated direction of the alignment films disposed between the first and second quest host layers.

7. The transmittance-variable device according to claim 1, further comprising:
a phase difference element disposed between the first and second guest host layers.

8. The transmittance-variable device according to claim 7, wherein the phase difference element has a plane phase difference for light with a wavelength of 550 nm in a range of 200 nm to 350 nm and a thickness direction phase difference in a range from −300 nm to 300 nm.

9. The transmittance-variable device according to claim 7, wherein an angle formed by a slow axis of the phase difference element and an optical axis of the liquid crystal hosts in the first and second guest host layers upon horizontal orientation is in a range of 35 degrees to 55 degrees.

10. The transmittance-variable device according to claim 7, wherein the phase difference element is a non-liquid crystal polymer film or a liquid crystal polymer film.

11. The transmittance-variable device according to claim 1, further comprising:
a first substrate;
a second substrate
a third substrate; and
a fourth substrate,
wherein the first guest host layer is disposed between the first and second substrates,
wherein the second guest host layer is disposed between the third and fourth substrates,
wherein the second and third substrates face each other, and
wherein a sum of plane phase differences of the second and third substrates for light with a wavelength of 550 nm is in a range of 200 nm to 350 nm.

12. The transmittance-variable device according to claim 1, further comprising:
a first substrate;
a second substrate
a third substrate; and
a fourth substrate,
wherein the first guest host layer is disposed between the first and second substrates,
wherein the second guest host layer is disposed between the third and fourth substrates,
wherein the second and third substrates face each other, and
wherein a phase difference element is disposed between the second and third substrates.

13. The transmittance-variable device according to claim 12, wherein a sum of plane phase differences of the second substrate, the phase difference element and the third substrate for light with a wavelength of 550 nm is in a range of 200 nm to 350 nm.

14. The transmittance-variable device according to claim 1, further comprising:
a first substrate;
a second substrate; and
a third substrate,
wherein the first, second, and third substrates are sequentially disposed,
wherein the first guest host layer is disposed between the first and second substrates,
wherein the second guest host layer is disposed between the second and third substrates, and
wherein the second substrate has a plane phase difference for light with a wavelength of 550 nm in a range of 200 nm to 350 nm.

15. Eyewear, comprising:
a left eye lens and a right eye lens; and
a frame for supporting the left eye lens and the right eye lens,
wherein the left eye lens and the right eye lens each comprise the transmittance-variable device of claim 1.

* * * * *